US008919222B2

(12) United States Patent
Scheiman

(10) Patent No.: US 8,919,222 B2
(45) Date of Patent: Dec. 30, 2014

(54) FOOT STABILIZER FOR A BIKE PEDAL

(75) Inventor: Donald R. Scheiman, Sunnyvale, CA (US)

(73) Assignee: Scheiman Rebuild Fitness, Inc, Sunnyvale, CA (US)

( * ) Notice: Subject to any disclaimer, the term of this patent is extended or adjusted under 35 U.S.C. 154(b) by 0 days.

(21) Appl. No.: 13/261,487

(22) PCT Filed: Apr. 28, 2011

(86) PCT No.: PCT/US2011/034359
§ 371 (c)(1),
(2), (4) Date: Dec. 21, 2012

(87) PCT Pub. No.: WO2011/139847
PCT Pub. Date: Nov. 10, 2011

(65) Prior Publication Data
US 2013/0091983 A1    Apr. 18, 2013

Related U.S. Application Data

(60) Provisional application No. 61/343,466, filed on Apr. 29, 2010.

(51) Int. Cl.
G05G 1/48    (2008.04)
B62M 3/08    (2006.01)
A63B 22/06   (2006.01)

(52) U.S. Cl.
CPC ............... *B62M 3/086* (2013.01); *B62M 3/08* (2013.01); *B62M 3/083* (2013.01); *A63B 2225/09* (2013.01); *A63B 22/0605* (2013.01)
USPC ........................................................ 74/562

(58) Field of Classification Search
USPC ............... 74/594.4–594.7, 560–564; 601/36; 482/57; 36/131
IPC .................................... G05G 1/48,1/483, 1/487
See application file for complete search history.

(56) References Cited

U.S. PATENT DOCUMENTS

| 1,210,016 | A | * | 12/1916 | Sunden | 74/563 |
| 1,292,760 | A | * | 1/1919 | Grant | 74/563 |
| 3,626,785 | A | * | 12/1971 | Ross | 74/512 |
| 3,960,027 | A | * | 6/1976 | Magnuson | 74/594.6 |
| 5,398,570 | A | * | 3/1995 | Chae | 74/563 |
| 6,370,984 | B1 | * | 4/2002 | Chang | 74/563 |

(Continued)

FOREIGN PATENT DOCUMENTS

JP    2006111103  A  *  4/2006

OTHER PUBLICATIONS

Machine translation of JP 2006-111103-A from JPO website.*

*Primary Examiner* — Thomas Diaz
*Assistant Examiner* — Adam D Rogers

(57) ABSTRACT

A platform upon which a humans foot can be placed has an upper and a lower surface, distal and proximal ends respectively corresponding to the toes and heel of the humans foot, and a ridge extending approximately vertically from the platforms upper surface around the perimeter of the proximal end of the platform to aid in retaining the humans heel at the proximal position of the platform when positioned on the upper surface of the platform. Associated with the platform is a distal plate adjustably connected to the distal region of the lower surface of the platform.

6 Claims, 13 Drawing Sheets

(56) References Cited

U.S. PATENT DOCUMENTS

| | | | |
|---|---|---|---|
| 6,619,156 B1 * | 9/2003 | Super et al. | 74/563 |
| 7,730,806 B1 * | 6/2010 | Grimaldi | 74/562 |
| 2002/0108466 A1 * | 8/2002 | Campagnolo | 74/594.4 |
| 2006/0048599 A1 * | 3/2006 | Wald | 74/594.6 |
| 2008/0221492 A1 * | 9/2008 | El'Chonen | 601/36 |

* cited by examiner

FOOT STABILIZER FOR A BIKE PEDAL

CROSS-REFERENCE TO RELATED APPLICATION

This patent application claims priority to U.S. provisional application No. 61/343,466 filed Apr. 29, 2010, which application is incorporated in its entirety herein by reference.

FIELD OF THE INVENTION

This invention helps people, who suffer from a stroke or have a neuromuscular disorder and who have lost muscular control of a leg or foot, in their cardiovascular and leg strengthening rehabilitation process. The condition that often accompanies a stroke is referred to as drop foot syndrome; a condition in the affected person does not have full muscular control of the affected foot. The invention is an article of manufacture that secures a person's foot to a pedal of a stationary bike in a manner that allows the person to keep his or her foot on the pedal without having it slip off. The article can easily be used to connect to any size of pedal. Thus, the patient can take the foot pedal adapter with her or him and use it with whatever stationary bike is available, whether upright, recumbent, or other design. The device allows a person to use a stationary bicycle for exercise who otherwise would be unable to do so.

PRIOR ART

One device that aids in keeping a foot on a tricycle is sold by Flag House Company as a foot pedal attachment for a tricycle. This device is designed to fit one type pedal and lacks portability to be securely adapted to any stationary bike pedal.

Another device known in the art is an adapter for a bike racer that is designed solely for a clip on attachment and only works with a clip on pedal. This device is known as a pedal plate and is made by Pearson Bikes. It is custom made from carbon fiber to suit the runner and biker's shoe size. It is not designed to help stroke patients who have drop foot syndrome.

SUMMARY OF THE INVENTION

One aspect of this invention is an article of manufacture for positioning a human foot on a bicycle pedal to aid a human in operating a bicycle having such a pedal. The article comprises a platform upon which the human's foot can be placed, the platform having an upper and a lower surface, distal and proximal ends respectively corresponding to the toes and heel of the human's foot, and a ridge extending approximately vertically from the platform's upper surface around the perimeter of the proximal end of the platform to aid in retaining the human's heel at the proximal position of the platform when positioned on the upper surface of the platform. Associated with the platform is a distal plate adjustably connected to the distal region of the lower surface of the platform, the distal plate having a distal edge and a proximal edge aligned with the distal and proximal regions of the platform. A proximal plate is also adjustably connected to the lower surface of the platform, but at the proximal region of the platform. The proximal plate has a distal edge and a proximal edge aligned with the distal and proximal regions of the platform. The distal plate and the proximal plate extend toward each other, and when the lower surface of the platform is positioned on the pedal by engaging the pedal between the lower surface of the platform and the upper surfaces of the distal and proximal plates, the plates are adjusted using a releasable securing mechanism to allow the pedal to be secured between the lower surface of the platform and the upper surfaces of the plates and allow the human's foot to be positioned and maintained to the upper surface of the platform as the bicycle pedal is rotated. The further details of this aspect of the invention with further combinations are seen in the detailed description section of this application and the claims.

Another aspect of this invention is an article of manufacture for positioning a human foot on a bicycle pedal to aid a human in operating a bicycle having such a pedal, which article comprises (a) a platform upon which the human's foot can be placed, the platform having an upper and a lower surface, distal and proximal ends respectively corresponding to the toes and heel of the human's foot, and a ridge extending approximately vertically from the platform's upper surface around the perimeter of the proximal end of the platform to aid in retaining the human's heel at the proximal position of the platform when positioned on the upper surface of the platform and (b) at least one flexible, elongated plate having a distal end corresponding to the distal end of the platform and a proximal end corresponding to the proximal end of the platform and an upper and lower surface, which plate is adjustably connected to the distal and proximal regions of the lower surface of the platform. This allows the pedal to be secured between the lower surface of the platform and the upper surface of the plate and allows the human's foot to be positioned and maintained to the upper surface of the platform as the bicycle pedal is rotated. The further details of this aspect of the invention with further combinations are seen in the detailed description section of this application and the claims.

Other aspects of the invention will be seen by viewing the Figures and reading the detailed description following.

DETAILED DESCRIPTION OF THE INVENTION

Figure 1:
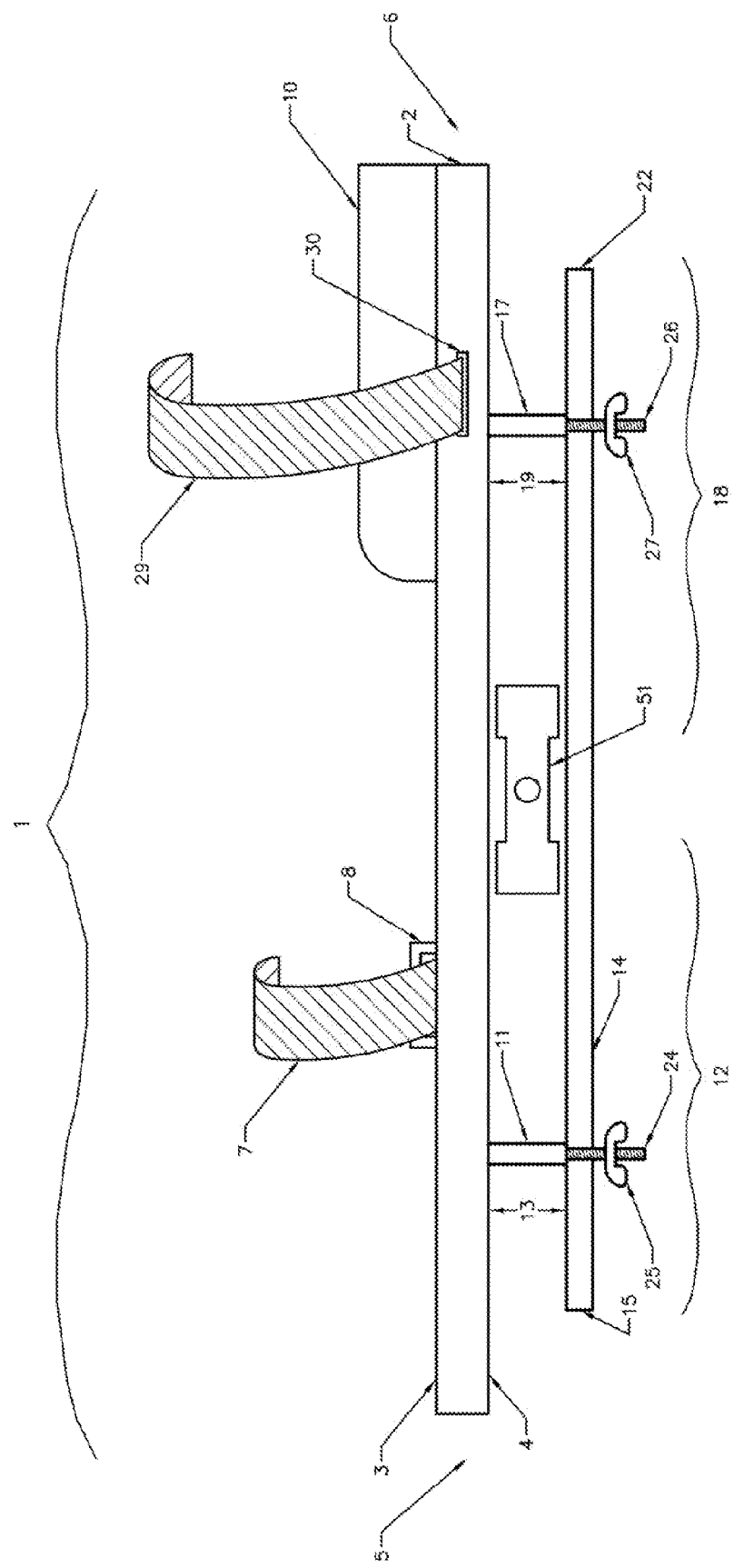
FIG. 1 is a side view of the article of manufacture of this invention.

People who suffer from a stroke or have a neuromuscular disorder often have weakness, numbness, or paralysis on one or the other side of their body. Often such symptoms will appear in the legs and particularly the foot. When a stroke occurs, the muscles on the side of the body affected will start to deteriorate and the person will lose coordination of the leg, for example. A common condition is known as drop foot and results in the affected person having difficulty walking because the foot drags along the ground. While deterioration starts quite quickly, through exercise some of the muscle tone can be rehabbed back to some degree of normalcy. I have found that a major problem with stroke victims, or patients with other neurological disorders with an affected leg and foot, is that in attempting to ride a stationary bicycle the foot is very weak and tends not to stay on the pedal. I have discovered this problem exists with all bike pedal designs used by major stationary bicycle manufacturers such as Cybex, SciFit, Sprint, Schwinn, and others. In discovering and analyzing this problem, I have found that the size of pedals varies significantly from company. to company. While the width of pedals tend to be in the range of about 3 to 6 inches, I have found that the length and the thickness of the available pedals cause significant issues in designing a solution to the problem. The length of the pedals can vary from about an inch and a half to seven inches or more, while the thickness can vary from about a quarter of an inch to more than 2 inches. I have found that this wide variation in pedal size leads to difficulties in rehabbing the leg over time and maintaining cardiovascular conditioning because patients get frustrated with the fact that their foot constantly slips off the pedal, thus interrupting their exercise pattern. While physical therapists have addressed this problem by using duct tape or ACE® bandages to connect the foot to the pedal, such an approach is time-consuming and does not provide a user friendly experience. I have successfully addressed this problem by designing a foot pedal adapter that secures the patient's foot to the pedal in a manner that can easily be adapted to any size of pedal. Thus, the patient can take the foot pedal adapter with her or him and use it with whatever stationary bike is available, whether upright, recumbent, or other design. I have found no other design that allows such portability with universal adaptability. While the device could be used with a moving bicycle as well, it is not commonly recommended because of other issues with balance that stroke victims also have.

The device of this invention can be viewed as an article of manufacture for positioning a human foot on a bicycle pedal to aid a human in operating, i.e., riding a bicycle having such a pedal. The device comprises several parts that are readily seen by referring to the various figures of this patent application.

In one aspect, the article of manufacture comprises several components. One component is a platform upon which the human's foot can be placed, the platform having an upper and a lower surface and distal and proximal ends corresponding to the toes and heel, respectively of the human's foot. The platform is generally elongated and may be square, rectangular, or elliptical and is sufficient to accept any size of human foot. It may vary in length from six inches to eighteen inches or more, while its width will generally be about 3 inches to about eight inches or more. Associated with the platform is a ridge extending approximately vertically from the platform's upper surface around the perimeter of the proximal end of the platform to aid in retaining the human's heel at the proximal position of the platform when positioned on the upper surface of the platform. Generally the ridge is permanently affixed to or integral with the platform, although in some instances it may be releasable attached. The ridge may be flexible or rigid and may be the same material as the platform or different. The height of the ridge may vary, but must be of sufficient height to prevent the heel from slipping from the platform. Thus, it may be no more than about a half inch in height to more than about 18 inches. Generally however, it will be no more than about 2 inches. To secure the platform to the pedal, at least one elongated plate is employed, wherein the plate has a distal end corresponding to the distal end of the platform for the user's foot and a proximal end corresponding to the proximal end of the platform. The plate has upper and lower surfaces and is designed to be releasably secured, Le., adjustably connected, to the distal and proximal ends of the platform to sandwich the pedal of the bicycle between the lower surface of the platform and the upper surface of the plate so that the human can keep his or her foot on the platform while operating the bicycle. The plate can be designed to extend the full distance of the platform or can be shorter than the full distance of the platform as will be discussed in greater detail. In some cases two plates can be effectively combined to provide a stable connection of the platform to the pedal. With this unique design of the article of manufacture of this invention, a stroke patient can readily perform exercise on a bicycle to gain cardiovascular fitness and leg strength in a regulated exercise regimen. Thus, it can be seen that the invention is a portable device or can be viewed as a combination of the portable device with a stationary bicycle, wherein the device is affixed to the pedal of such bicycle. In addition the portable device may be usefully combined with a cyclometer or motion sensor to measure the number of rotations that the device makes on the bike.

Referring first to FIG. 1, the article 1 is shown in a side view. It comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 7 is connected to the platform 2 and positioned to secure the human's foot to the upper surface 3 of the platform. The upper and lower surfaces of the platform may be smooth, but alternatively may be rough or uneven to aid in frictionally maintaining the foot in position on the upper surface of the platform and the pedal on the lower surface through frictional force. The strap 7 may designed to encircle the platform or may secured to a connection 8 shown on the upper side surface 3 of platform 2, but it may also be positioned at the side of the platform or on the lower surface 4. The strap 7 may be adjustable and have a series of snaps, buttons, buckles or other equivalent fastening means. Generally, however, it is found that using a fabric hook and loop fastener, for example a VELCRO® brand strap, works easily and well. A hook and loop fastener generally has two lineal fabric strips attached to the surfaces to be fastened together. The first strip surface has tiny hooks and the second strip surface has even smaller, hairier loops. When pressed together the hooks attach to the loops to form a strong bond that can be released only with difficulty by pulling them apart. Generally the fabric employed is a nylon or polyester material. The strap 7 is optional for people who have progressed to the point where it is no longer needed or had not required that level of security to begin with. The device further has an optional ridge 10 extending approximately vertically from the platform's upper surface 3 around the perimeter of the proximal end 6 of the platform 2 to aid in retaining the human's heel at the distal position of the platform when secured to the upper surface of the platform with the aid of the strap 7. An optional second strap 29 may be employed to aid in securing the foot to the platform surface 3 using connection means 30 to connect the strap to the platform 2. With two straps the human foot can be angled on the platform to accommodate the angle of the user's foot relative to the longitudinal axis of the platform.

To connect the platform to the bike pedal, at least one plate 14 is used to secure the pedal as can be seen by the following discussion of FIG. 1. At the lower surface 4 of the platform 2 is a receptacle for receiving threaded bolt or screw 24 at the distal end 12 and another threaded receptacle located at the proximal end 18 to attach the plate to the platform. While the receptacle may be flush with the surface 4 of the platform 2, FIG. 1 shows a distal body 11 extending perpendicularly from the distal region 12 of the lower surface of the platform a distance 13 that is about the thickness of the pedal of the bicycle shown and having the plate 14 adjustably connected to the distal body 11. The plate, which is best to be flexible, has a distal edge 15 and a proximal edge 22. It will be recognized that while the position of the distal body 11 is shown at about the midpoint of the distal half of platform 2, it may be positioned distally or proximally of where shown. Similarly the position of body 17 may also be adjusted. While the plate 14 can be snugged against the pedal by various means, it is found that by having threaded bolts 24 and 26 extending to or from the respective bodies 11 and 17, which bolts have heads or threaded nuts 25 and 27 (for example wing nuts in this example) and can be screwed onto the bolts to adjustably connect the plate against the pedal. Alternatively, the plate could be attached using a strap that can be tightened and that extends through the plate and bodies to secure the plate to the respective bodies and tighten the plate onto the pedal. Other attachment mechanisms can be visualized by those skilled in the art. For greater security of the foot on the platform attached to the pedal a releasable strap 7 may be connected to the platform at the distal region 12 of the platform 2. Alternatively or additionally a sole or second releasable strap 29 is connected to the platform in the proximal region 18 of the platform to secure the user's heel to the proximal region of the upper surface 3 of the platform 2. The second strap helps to ensure that the user's heel is securely attached to the platform 2. Thus, in examining FIG. 1, one can see that the plate 14 is positioned to sandwich a pedal 51 by engaging or sandwiching the pedal between the lower side of the platform 2 and the upper side of plate 14 while the plate is adjusted to secure the platform to the pedal and allow the human's foot to he secured to the upper surface of the platform with or without the strap 7 alone or in combination with strap 29. In this and the other configurations of FIGS. 2-5, the upper and lower surfaces of platform 2 are advantageous roughed to minimize slippage. Similarly, the upper surfaces of plates 14, 20, and 50 are roughened to aid in minimizing slippage.

Figure 2:
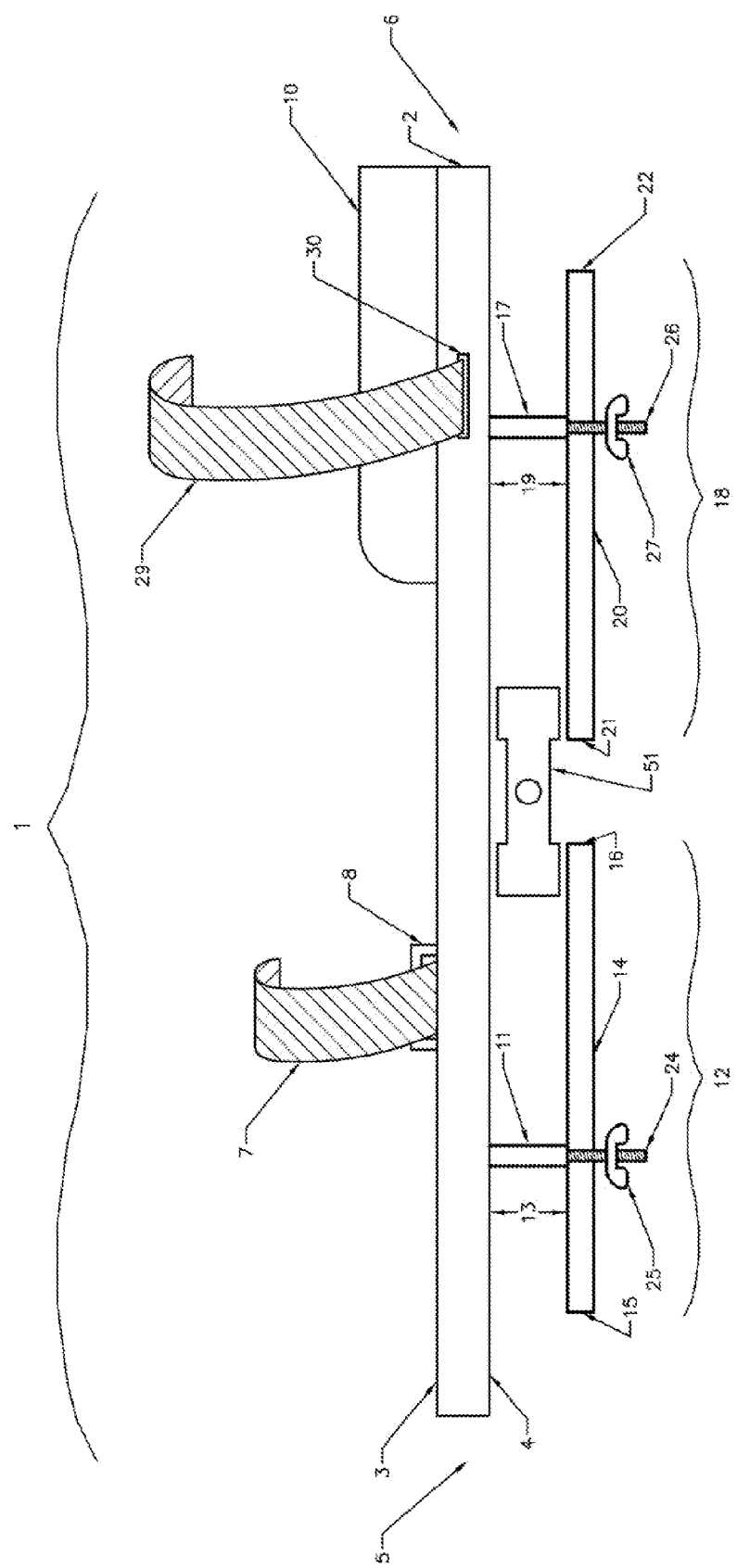
FIG. 2 is a side view of another aspect of the article of manufacture of this invention.

Referring next to FIG. 2, another aspect of the article of this invention, again referred to as 1, is shown in a side view. It comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 7 is connected to the platform 2 and positioned to secure the human's foot to the upper surface 3 of the platform. The upper and lower surfaces of the platform may be smooth, but alternatively may be rough or uneven to aid in maintaining the foot in position on the upper surface of the platform and the pedal on the lower surface through frictional force. The strap 7 may designed as discussed in reference to FIG. 1. The device further has an optional ridge 10, having dimensions discussed previously, extending approximately vertically from the platform's upper surface 3 around the perimeter of the proximal end 6 of the platform 2 to aid in retaining the human's heel at the distal position of the platform. An optional second strap 29 may be employed to aid in securing the foot to the platform surface 3 using connection means 30 to connect the strap to the platform 2.

To connect the platform to the bike pedal 51 in FIG. 2, two plates 14 (the same numeral used in FIGS. 1) and 20 are used to secure the pedal. As in FIG. 1, secured to the lower surface 4 of the platform 2 is a distal body 11 extending perpendicularly from the distal region 12 of the lower surface of the platform a distance 13 that is about the thickness of the pedal of the bicycle and having a flexible but rigid distal plate 14 adjustably connected to the body 11, the plate having a distal edge 15 and a proximal edge 16. A second body, that is a proximal body 17, extending perpendicularly from the proximal region 18 of the lower surface 4 of the platform 2 by a distance 19 that is about the thickness of the pedal of the bicycle and having a flexible but rigid proximal plate 20 adjustably connected to the proximal body 17, the proximal plate having a distal edge 21 and a proximal edge 22. By having the two plates arranged as they are, allows for the fitting of the pedal between the lower surface 4 of platform 2 and the upper surface of each of plates 14 and 20, which can then be tightened against the pedal. While the plate can be tightened against the pedal by various means, it is found that by having threaded bolts 24 and 26 extending from the respective bodies 11 and 17, threaded nuts 25 and 27 (for example wing nuts) can be screwed onto the bolts to adjustably secure the plate against the pedal. The plates may be made of various materials such as metal, plastic, rubber, carbon fiber, or wood that can be chosen to fit the type of characteristics desired. Tempered steel, a hard but flexible rubber, and polycarbonate plastic are examples of materials that are readily available. It is desirable to use a material that has some flexibility but good memory retention. Thus, in examining FIG. 2, one can see that the distal plate 14 and the proximal plate 20 extend toward each other but adjacent edges 16 and 21, respectively, of the plates do not do not overlap when the article is positioned on the pedal 51 by engaging the pedal between the lower side of the platform 2 and the upper surfaces of distal and proximal plates (14 and 20) and the plates are adjusted to secure the platform to the pedal and allow the human's foot to be secured to the upper surface of the platform with or without the strap 7 alone or in combination with strap 29. An advantage that the two plate design has over the one plate design is that the angle of the platform relative to the rotary motion of the pedal can be adjusted slightly to accommodate a user's foot that may be angled toe in (pigeon-toed) or toe out (duck footed) and still keep the user's foot secure.

Figure 3:
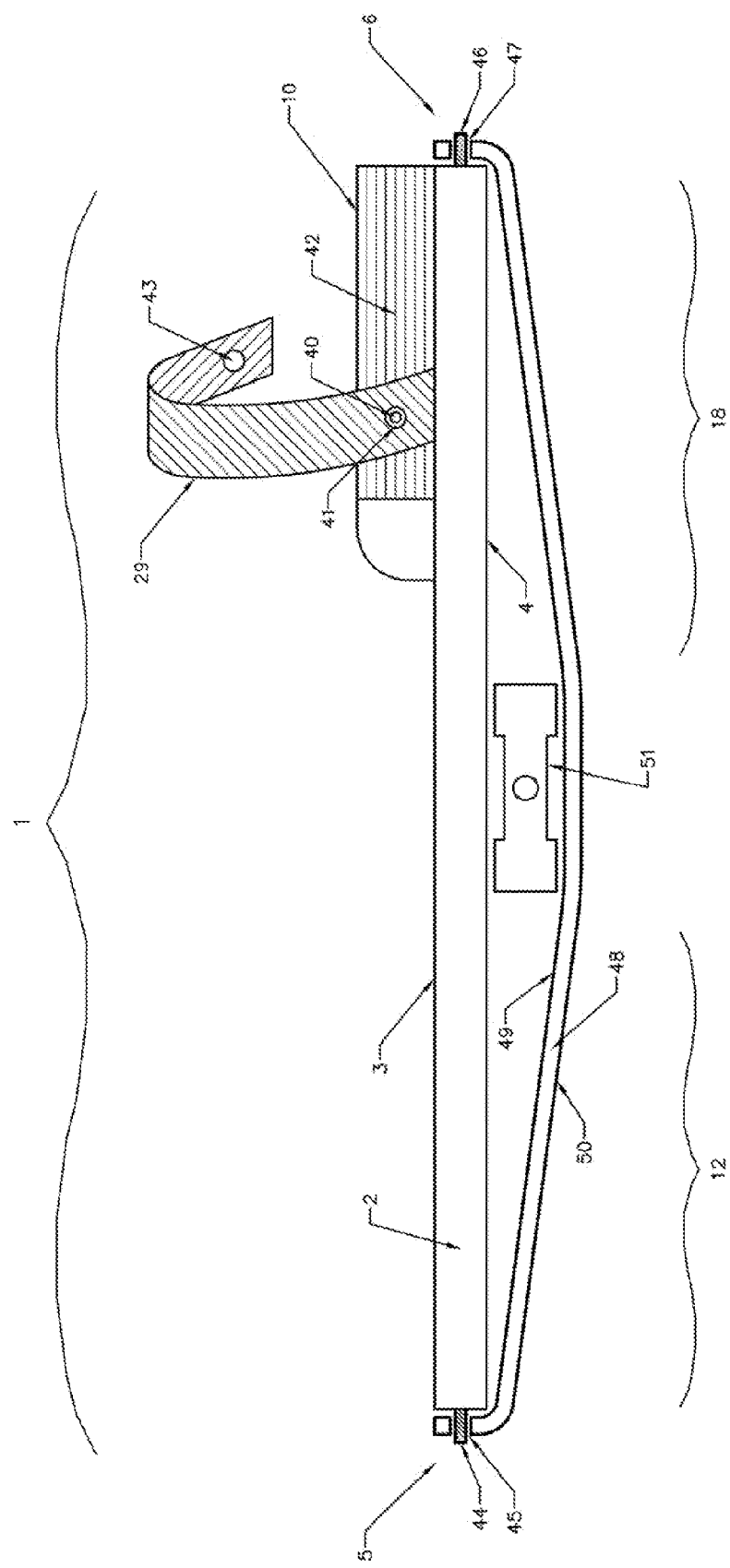
FIG. 3 is a side view of still another aspect of the article of manufacture of this invention.

Referring next to FIG. 3, another aspect of the article of this invention, again referred to as 1, is shown in a side view. Again, it comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 29 is connected to the platform 2 at ridge 10 and positioned to secure the human's foot to the upper surface 3 of the platform as discussed below. Again, the upper and lower surfaces of the platform may be smooth, but alternatively may be rough or uneven to aid in maintaining the foot in position on the upper surface of the platform and the pedal on the lower surface through frictional force. The device further has an optional ridge 10 extending approximately vertically from the platform's upper surface 3 around the perimeter of the proximal end 6 of the platform 2 to aid in retaining the human's heel at the distal position of the platform. The optional strap 29 may be employed to aid in securing the foot to the platform surface 3 using one of several alternative connections to connect the strap to the platform 2. In one alternative, the strap 29 may have at least one hole 41 at one end of the strap that fits over a peg or extension 40 that extends perpendicularly from the outer surface 42 of ridge 10. At the other end of strap 29 is another hole 43, or series of holes, that could fit over a corresponding peg or extension on the out surface of the ridge, not shown, to aid in securing the user's foot to the surface of the platform. Alternatively, the outer surface 42 of ridge 10 and the inner surface of strap 49 could be designed as a fabric hook and loop fastener assembly that would allow the user to aid in attaching the user's foot to the platform, as discussed previously.

To connect the platform to the bike pedal 51 in FIG. 3, one plate 48 (corresponding to plate 14 in FIG. 1) is used to secure the pedal. Here, plate 48 has a distal region 12 and a proximal region 18 corresponding to the distal and proximal ends of the platform 2. To secure the plate to the platform 2 and secure the pedal 51, the distal end of plate 48 has at least one distal hole or opening 45 that fits over a peg or extension 44 at the distal end 5 of platform 2. At the proximal end of plate 48 is at least one hole 47 that fits over peg or extension 46 at the proximal end 6 or platform 2. Alternatively, the distal and proximal surfaces of plate 48 could employ a hook and loop fastener arrangement with the corresponding end surfaces of platform 2. While the plate can be made of various materials such as metal, plastic, rubber, carbon fiber, or wood that can be chosen to fit the type of characteristics desired. Tempered steel, a hard but flexible rubber, and polycarbonate plastic are examples of materials that are readily available. It is desirable to use a material that has good memory retention.

Figure 4:
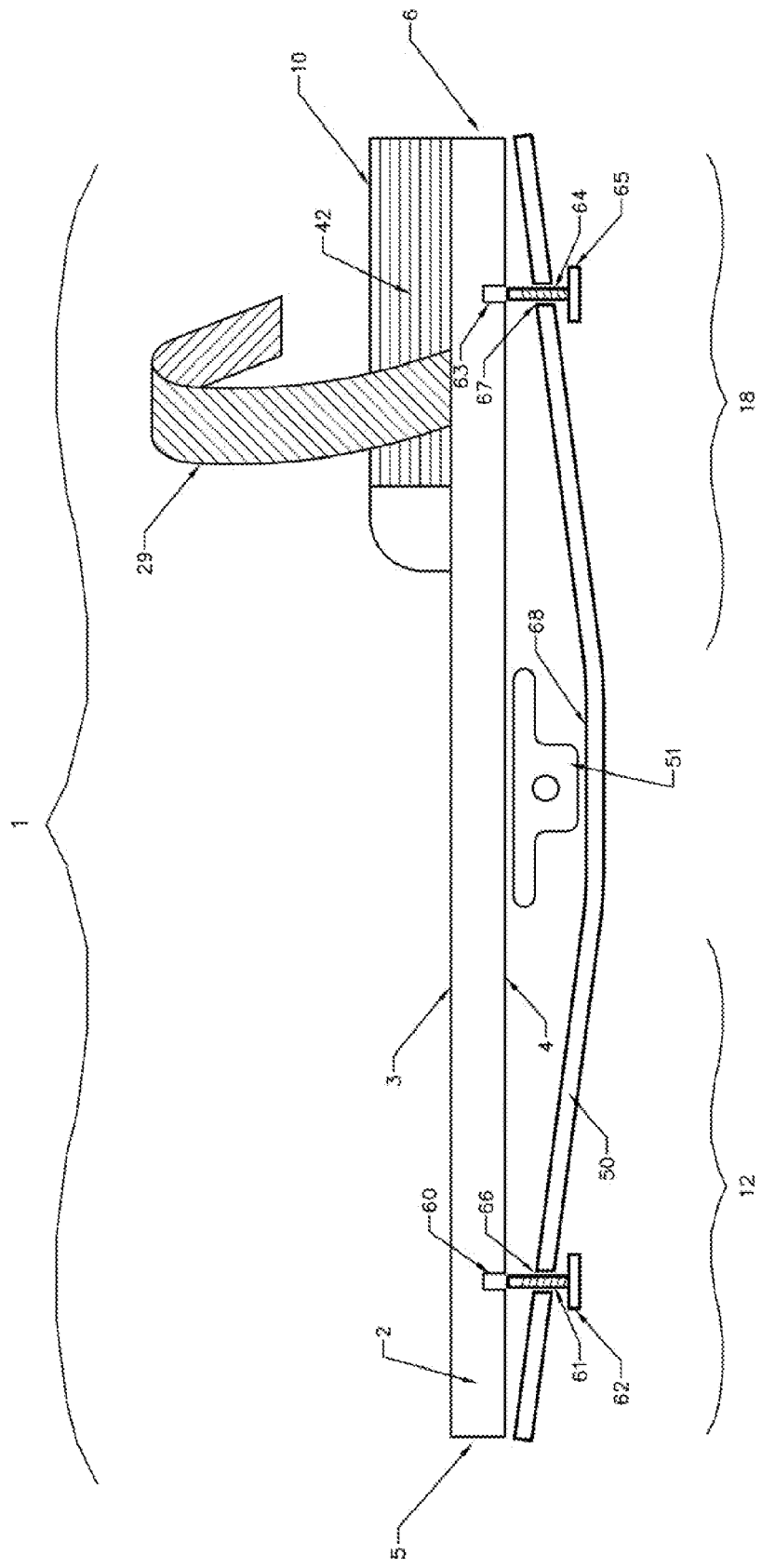
FIG. 4 is a side view of still another aspect of the article of manufacture of this invention.

Turning next to FIG. 4, another aspect of the article of this invention, again referred to as 1, is shown in a side view. Again, it comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 29 is connected to the platform 2 at ridge 10 and positioned to secure the human's foot to the upper surface 3 of the platform as discussed below. Again, the upper and lower surfaces of the platform may be smooth, but alternatively may be rough or uneven to aid in maintaining the foot in position on the upper surface of the platform and the pedal on the lower surface through frictional force. The device further has an optional ridge 10 extending approximately vertically from the platform's upper surface 3 around the perimeter of the proximal end 6 of the platform 2 to aid in retaining the human's heel at the distal position of the platform. The optional strap 29 may be employed to aid in securing the foot to the platform surface 3 using one of several alternative connections to connect the strap to the platform 2. In the alternative shown in this FIG. 4, the outer surface 42 of ridge 10 and the inner surface of strap 49 are designed as a fabric hook and loop fastener assembly that would allow the user to aid in attaching the user's foot to the platform, as discussed hereinbefore.

To connect the platform to the bike pedal 51 in FIG. 4, one plate 50 (corresponding to plate 14 in FIGS. 1 and 48 in FIG. 3) is used to secure the pedal. Here, plate 50 has a distal region 12 and a proximal region 18 corresponding to the distal and proximal ends of the platform 2. To secure the plate to the platform 2 and secure the pedal 51, the distal end of plate 50 has at least one distal hole or opening 66 through which a male threaded screw 61 having a handle 62 that allows the user to fit the screw 61 into female receptacle 60 in lower surface 4 at the distal end 5 of platform 2. At the proximal end of plate 50 is at least one distal hole or opening 67 through which a male threaded screw 64 having a handle 65 that allows the user to fit the screw 64 into female receptacle 63 in lower surface 4 at the proximal end 6 of platform 2. While the plate can be made of various materials such as metal, plastic, rubber, carbon fiber, or wood that can be chosen to fit the type of characteristics desired. Tempered steel, a hard but flexible rubber, and polycarbonate plastic are examples of materials that are readily available. It is desirable to use a material that has good memory retention. Thus, in examining FIG. 4, one can see that the upper surface 68 of plate 50 and the lower surface 4 of platform 2 secure the pedal 51 between them and allow the human's foot to be secured to the upper surface of the platform with or without the strap 29.

Figure 5:
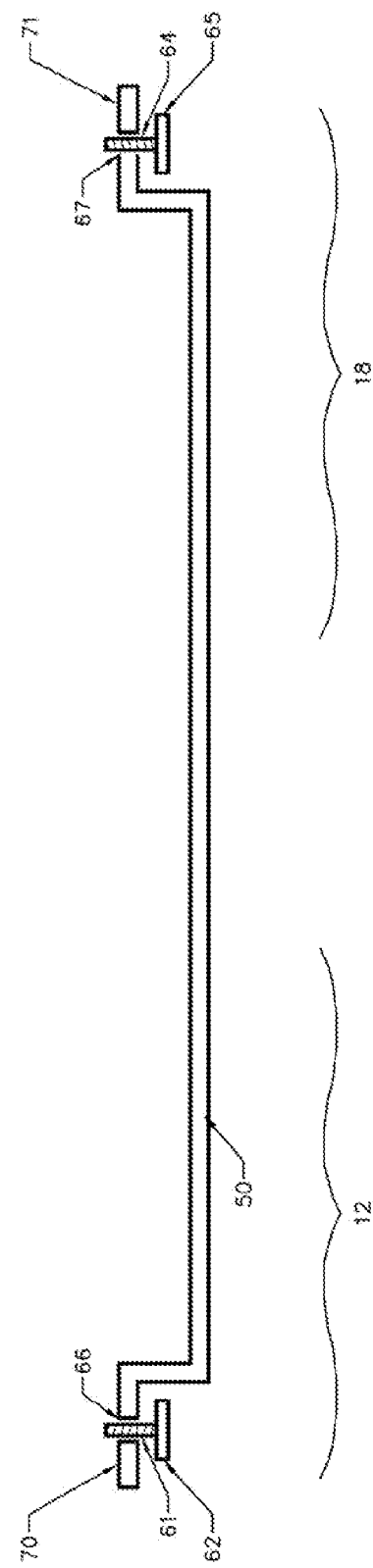
FIG. 5 is a side view of a plate useful as a substitute for a plate shown in the FIG. 4 aspect of the article of manufacture of this invention.

While the plate has been described previously in FIGS. 1-4 as a planar structure, it will be recognized by one of skill in the art that it could take the shape shown in FIG. 5. Here the plate 51 is designed to be a U-shaped plate that has ears 70 and 71 extending as shown. At the distal end 12 of plate 50, screw 61 having head 62 would fit through hole 66 for insertion into threaded receptacle 60 of FIG. 4. Similarly, at the proximal end 18 of plate 50 screw 64 having head 65 would fit through hole 67 for insertion into threaded receptacle 63 of FIG. 4. It will be recognized that this design can be applied to the 2 plate arrangement of FIG. 2 as well.

Figure 6:
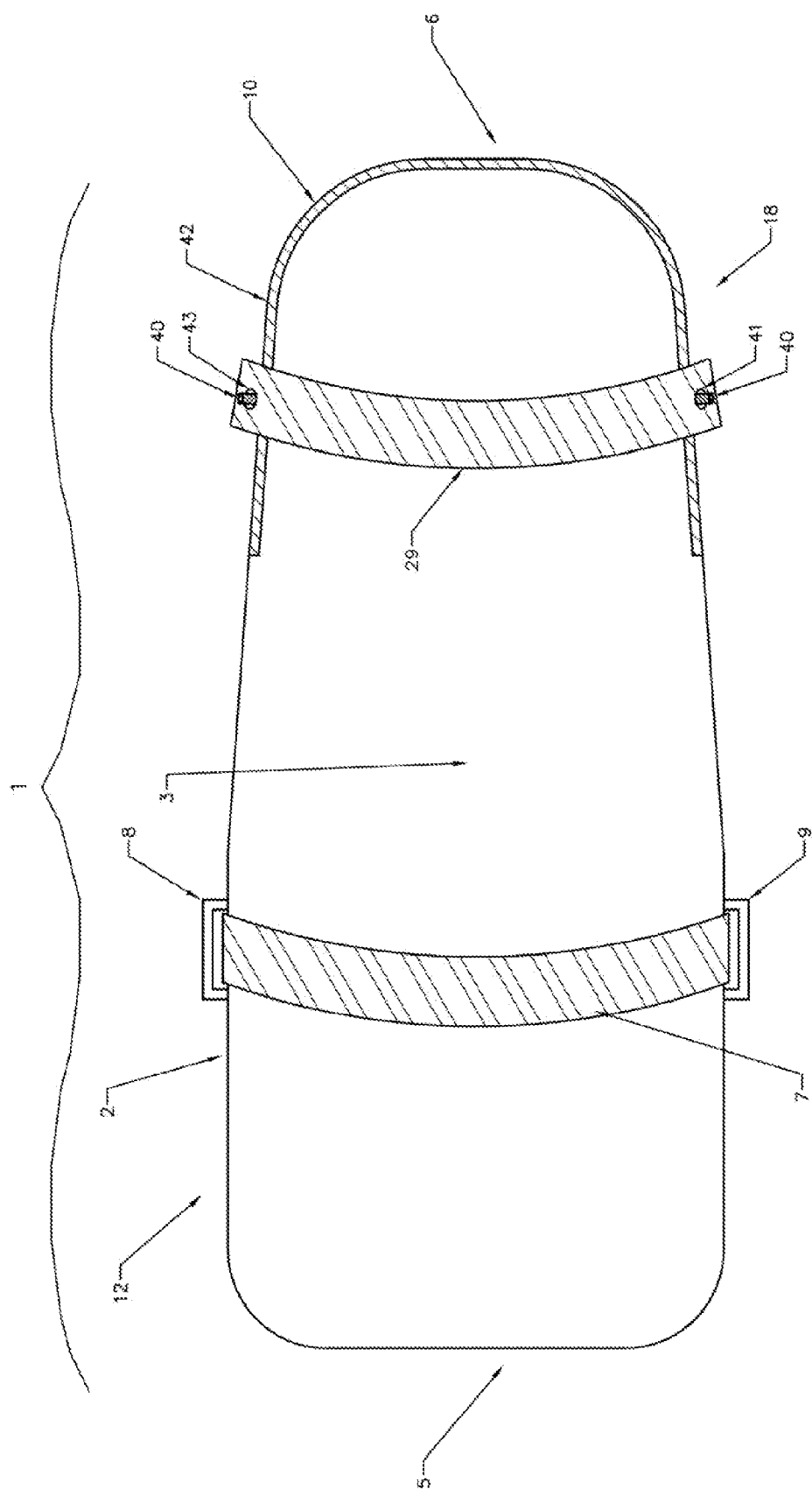
FIG. 6 is a top view of still another aspect of the article of manufacture of this invention.

Turning now to FIG. 6, one can see the article of manufacture of this invention from a top view of FIGS. 1-4. The device comprises a platform 2 with an upper surface 3 and a distal end 5 and a proximal end 6, which correspond to the toe and heel of the foot of a user, respectively. At the proximal end is an optional ridge 10 secured to the upper surface 3 and extending a distance that aids in keeping the user's foot positioned on the platform's upper surface 3. The optional strap 7 fits over the user's mid-foot region to further aid in positioning and maintaining the user's foot on the upper surface of the platform while in use. The strap 7 is connected to the platform 2 by the use of connection points 8 and 9. The strap can simply fit through the opening shown, be brought around the foot and secured by using buttons, a buckle, a tie, or a hook and loop tape, such as a VELCRO brand tape. As shown in FIG. 3, an additional strap 29 can be employed to further secure the user's foot during use. In one alternative, the strap 29 may have at least one hole 41 at one end of the strap that fits over a peg or extension 40 that extends perpendicularly from the outer surface 42 of ridge 10. At the other end of strap 29 is another hole 43, or series of holes, that could fit over a corresponding peg or extension 40 on the outer surface of the ridge to aid in securing the user's foot to the surface of the platform. Alternatively, the outer surface 42 of ridge 10 and the inner surface of strap 29 could be designed as a fabric hook and loop fastener assembly that would allow the user to aid in attaching the user's foot to the platform.

Figure 7:
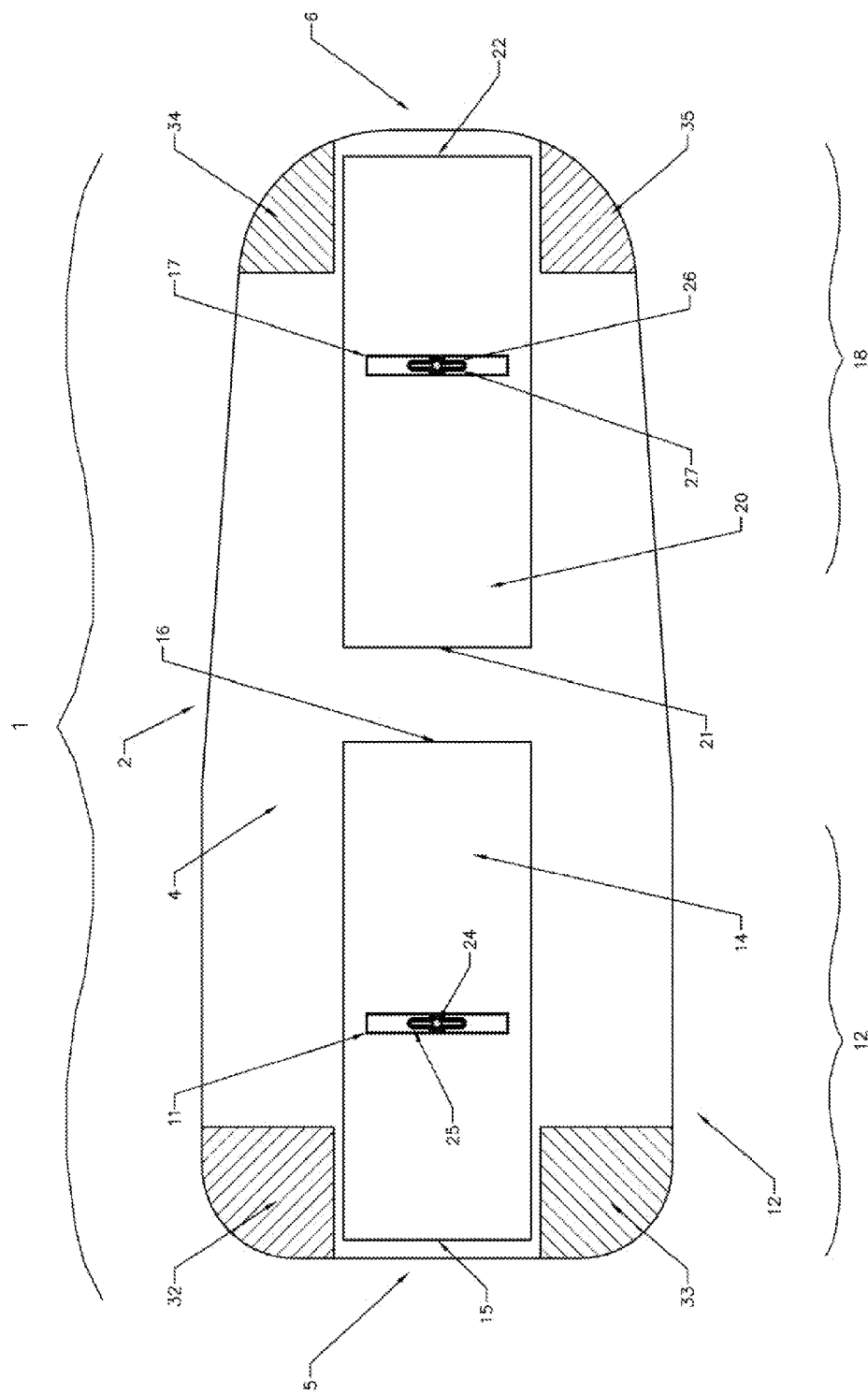
FIG. 7 is a bottom view of the article of manufacture of this invention shown in FIG. 2.

Turning now to FIG. 7 one can see the bottom view of one aspect of the article of this invention depicted above in FIG. 2 in a side view. The lower surface 4 of platform 2 is shown having distal body 11 attached to the lower surface 4 and threaded bolt 24 extending from the distal body and fitting through distal plate 14, which is secured with wing nut 25. Also shown as an optional aspect are distal extensions 32 and 33, which are secured to the lower surface 4 and extend a depth that is sufficient to prevent any significant sideways, i.e., lateral, movement of the distal end 15 of distal plate 14. Such a depth may vary between a quarter of an inch to an inch. Thus, distal end 15 of plate 14 is snugly secured between extensions 32 and 33 when the plate 14 is positioned to sandwich the bike pedal (not shown) between the lower surface 4 and the plate 14. Similarly, the lower surface 4 of platform 2 is shown having proximal body 17 attached to the lower surface 4 and threaded bolt 26 extending from the proximal body and fitting through proximal plate 20, which is secured with wing nut 27. Also shown as an optional aspect are proximal extensions 34 and 35, which are secured to the lower surface 4 and extend a depth that is similarly sufficient to prevent any significant sideways movement of the proximal end 22 of proximal plate 20. Thus, proximal end 22 of plate 20 is snugly secured between extensions 34 and 35 when the plate 20 is positioned to sandwich the bike pedal between the lower surface 4 and the plate 20. When both plates 14 and 20 are fully secured by the wing nuts being tightened on the respective bolts the platform is secured to the pedal and the user's foot is then secured in the device and ready to use. Edges 16 and 21 of plates 14 and 20 are adjacent but generally will not touch. The plate 14 and 20 are made of a material that is rigid, but at the same time has a certain degree of flexibility to easily secure the pedal after many uses. Such a material may be of material know to one of skill in the art, as suggested above, particularly a plastic such as a polycarbonate or a metal such as tempered steel, an aluminum alloy, or the like. The plates may alternatively have two or more layers, with the layer that contacts the pedal being softer so that it grips the pedal for greater security. The distance between the downwardly extending distal body 11 and the proximal body 17 designed to be such that any commercially available pedal of any bicycle can fit in the space between the two, while the distance between the lower surface 4 and the plates 14 and 20 is designed to accommodate the thickness of any commercial pedal of a bicycle, whether stationary or moveable.

Figure 8:
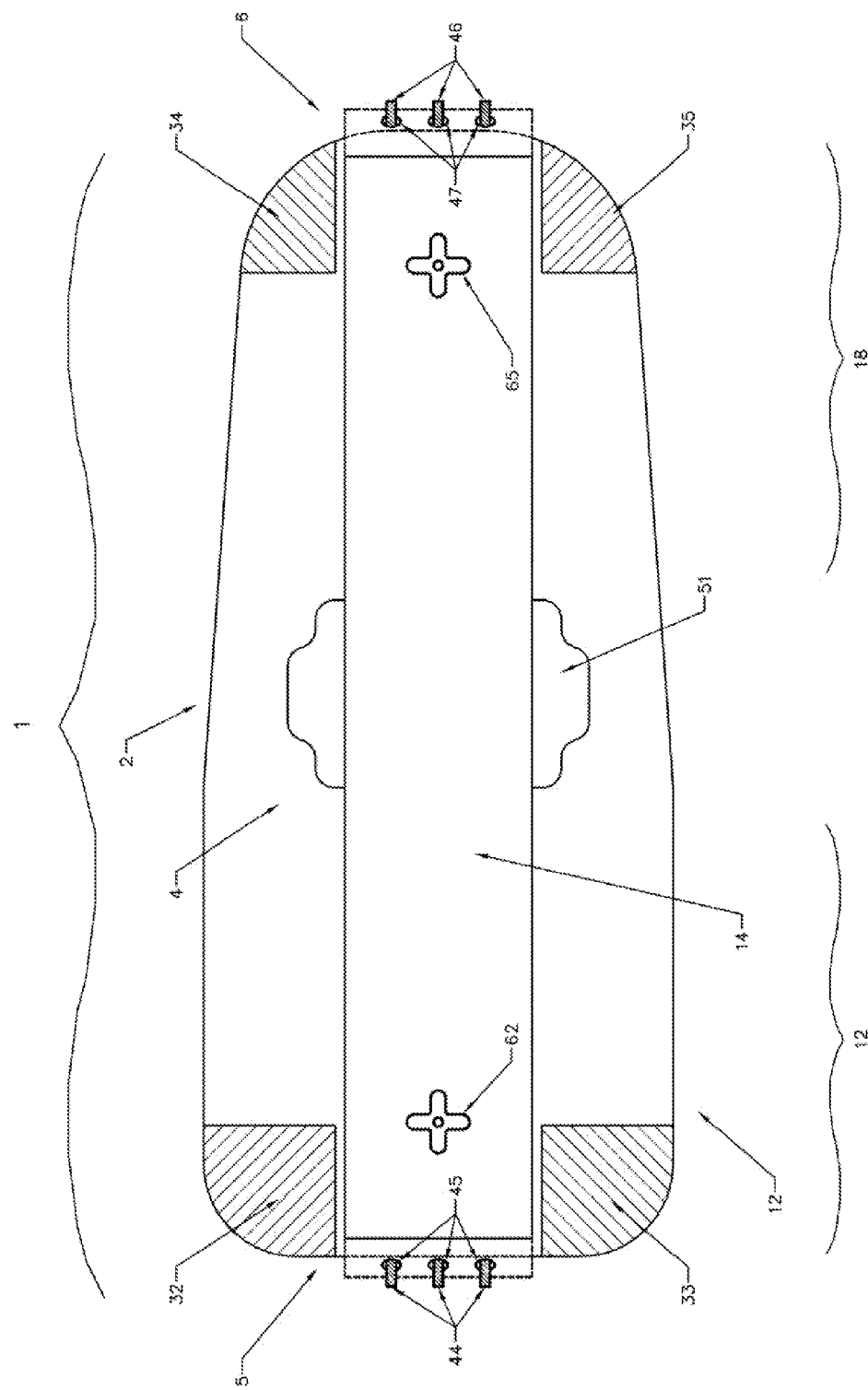
FIG. 8 is a bottom view of the article of manufacture of this invention shown in FIG. 1.

Turning now to FIG. 8, one can see the bottom view of one aspect of the article of this invention depicted above in FIGS. 1 and in a side view. The lower surface 4 of platform 2 is shown having threaded bolt with a knurled head 62 extending through plate 14 to insert into a complementary threaded female receptacle, not shown, which plate 14 is secured with the threaded bolt having head 62 to the lower surface of platform 2. Also shown as an optional aspect are distal extensions 32 and 33, which are secured to the lower surface 4 and extend a depth that is sufficient to prevent any significant sideways movement of the distal end 15 of distal plate 14. Thus, distal end 15 of plate 14 is snugly secured between extensions 32 and 33 when the plate 14 is positioned to sandwich the bike pedal 51 between the lower surface 4 and the plate 14. Similarly, as an optional aspect are proximal extensions 34 and 35, which are secured to the lower surface 4 and extend a depth that is sufficient to prevent any significant sideways movement of the proximal end 22 of plate 14. Thus, proximal end 22 of plate 14 is snugly secured between extensions 34 and 35 when the plate 14 is positioned to sandwich the bike pedal 51 between the lower surface 4 and the plate 20. When plate 14 is fully secured by the knurl headed bolts being tightened in the respective threaded receptacles the platform is secured to the pedal and the user's foot is then secured in the device and ready to use. The plate is made of a material that is rigid, but at the same time has a certain degree of flexibility to easily secure the pedal after many uses. Such a material may be a sturdy rubber, carbon fiber, or a plastic such as a polycarbonate or a metal such as tempered steel, an aluminum alloy, or the like. The plate may alternatively have two or more layers, with the layer that contacts the pedal being softer so that it grips the pedal for greater security. Alternatively, the upper surface of the plate 14 may be roughened to aid in frictionally securing the pedal 51. The distance between the knurled headed bolts 62 and 65 downwardly extending distal body 11 and the proximal body 17 designed to be such that any commercially available pedal of any bicycle can fit in the space between the two, while the distance between the lower surface 4 and the plates 14 and 20 is designed to accommodate the thickness of any commercial pedal of a bicycle, whether stationary or moveable. An alternative means to secure the plate to the platform 2 and secure the pedal 51 between the two, is to provide the distal end of plate 14 with at least one distal hole or opening 45 (three are shown here) that fits over a peg or extension 44 (again three are shown) at the distal end 5 of platform 2. At the proximal end of plate 14 is at least one hole 47 (three shown) that fits over peg or extension 46 (three shown) at the proximal end 6 or platform 2. Alternatively, the distal and proximal surfaces of plate 48 could employ a hook and loop fastener arrangement with the corresponding end surfaces of platform 2. Of course, if the latter arrangement is used the knurled headed bolts 62 and 65 would not be needed. It will be further apparent to one of skill in the art that an alternative way to prevent the sideways movement of distal and proximal ends of plate 14 is to have roughened distal surfaces of the lower surface 4 of platform 2 and the upper surface of plate 14 and roughened proximal surfaces of the lower surface 4 of platform 2 and the upper surface of plate 14. This concept applies to the designs shown in FIGS. 7-10.

Figure 9:
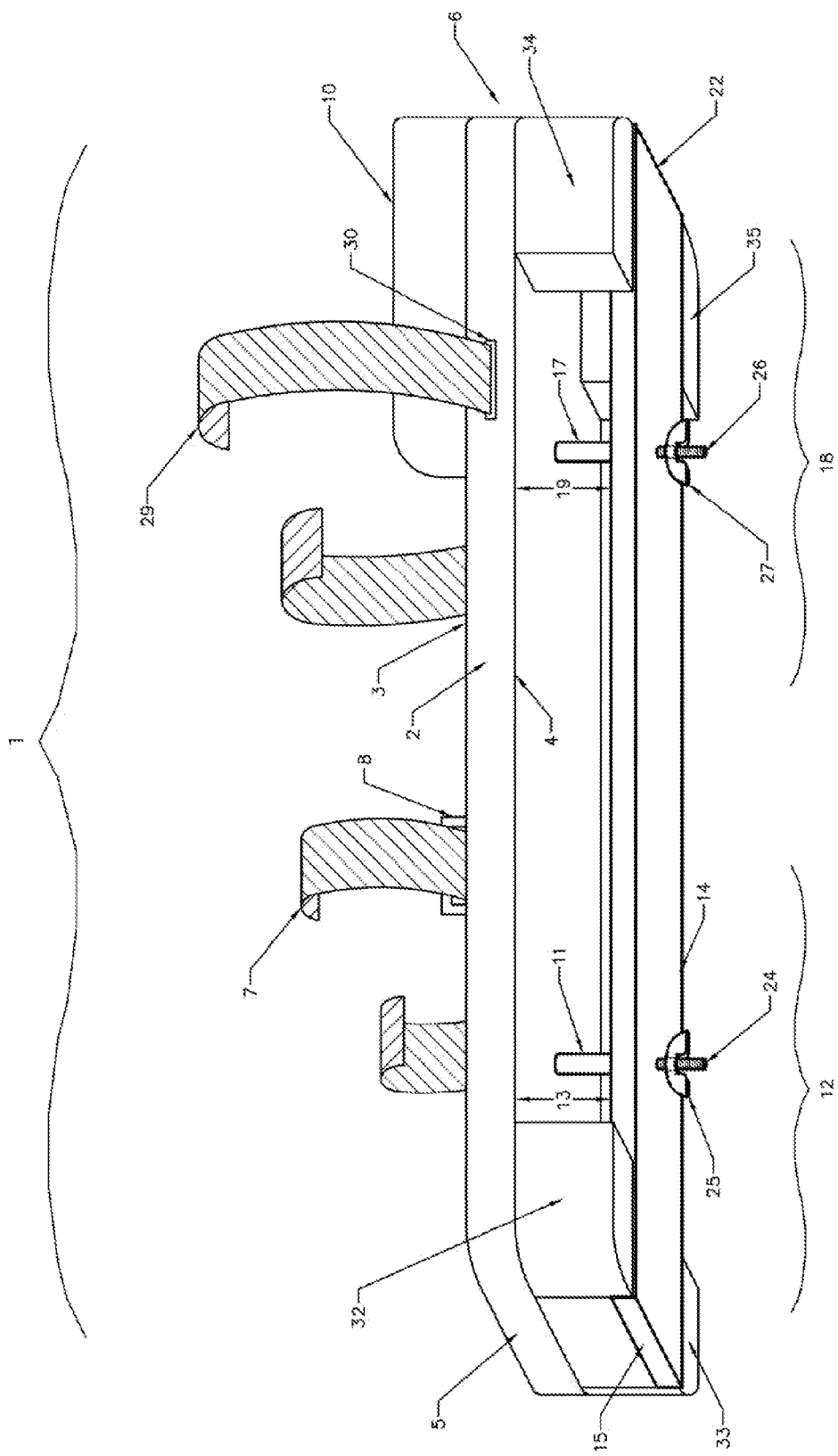
FIG. 9 is a perspective view of the article of manufacture of this invention shown in FIGS. 1 and 3.

Turning now to FIG. 9, one can see a perspective view of the article of manufacture of this invention showing the numerous aspects of Figure The numbers used in describing FIG. 9 will refer to the same parts as discussed in FIGS. 1. It comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 7 is connected to the platform 2 and positioned to secure the human's foot to the upper surface 3 of the platform. The strap 7 is shown here to be secured to a connection 8 shown on the upper side surface 3 of platform 2. The strap is shown as a fabric hook and loop fastener VELCRO® brand strap. The strap 7 is optional for people who have progressed to the point where it is no longer needed or had not required that level of security to begin with. The device further has an optional ridge 10 extending approximately vertically from the platform's upper surface 3 around the perimeter of the proximal end 6 of the platform 2 to aid in retaining the human's heel at the distal position of the platform when secured to the upper surface of the platform with the aid of the strap 7. An optional second strap 29 may be employed to aid in securing the foot to the platform surface 3 using connection means 30 to connect the strap to the platform 2. Secured to the lower surface 4 of the platform 2 is a distal body 11 extending perpendicularly from the distal region 12 of the lower surface of the platform a distance 13 that is about the minimal thickness of the pedal of the bicycle and having a flexible but rigid plate 14 adjustably connected to the distal body 11. A second body, that is a proximal body 17 extending perpendicularly from the proximal region 18 of the lower surface 4 of the platform 2 by a distance 19 that is about the thickness of the pedal of the bicycle and having the plate 14 adjustably connected to the proximal body 17. While the plate can be snugged against the pedal by various means discussed herein with regard to the other figures, it is found that by having threaded bolts 24 and 26 extending from the respective bodies 11 and 17, threaded nuts 25 and 27 (for example wing nuts shown here) can be screwed onto the bolts to adjustably secure the plates against the pedal. Also shown as an optional aspect are distal extensions 32 and 33, which are secured to the lower surface 4 and extend a depth that is sufficient to prevent any significant sideways movement of the distal end 15 of distal plate 14. Thus, distal end 15 of plate 14 is snugly secured between extensions 32 and 33 when the plate 14 is positioned to sandwich the bike pedal (not shown) between the lower surface 4 and the plate 14. Similarly, the lower surface 4 of platform 2 is shown having proximal body 17 attached to the lower surface 4 and threaded bolt 26 extending from the proximal body and fitting through the proximal region of plate 14, which is secured with wing nut 27. Also shown as an optional aspect are proximal extensions 34 and 35, which are secured to the lower surface 4 and extend a depth that is sufficient to prevent any significant sideways movement of the proximal end 22 of proximal plate 20. Thus, proximal end 22 of plate 14 is snugly secured between extensions 34 and 35 when the plate is positioned to sandwich the bike pedal between the lower surface 4 and the upper surface of plate 14. When plate 14 is fully secured by the wing nuts being tightened on the respective bolts the platform is secured to the pedal and the user's foot is then secured in the device and ready to use.

Figure 10:
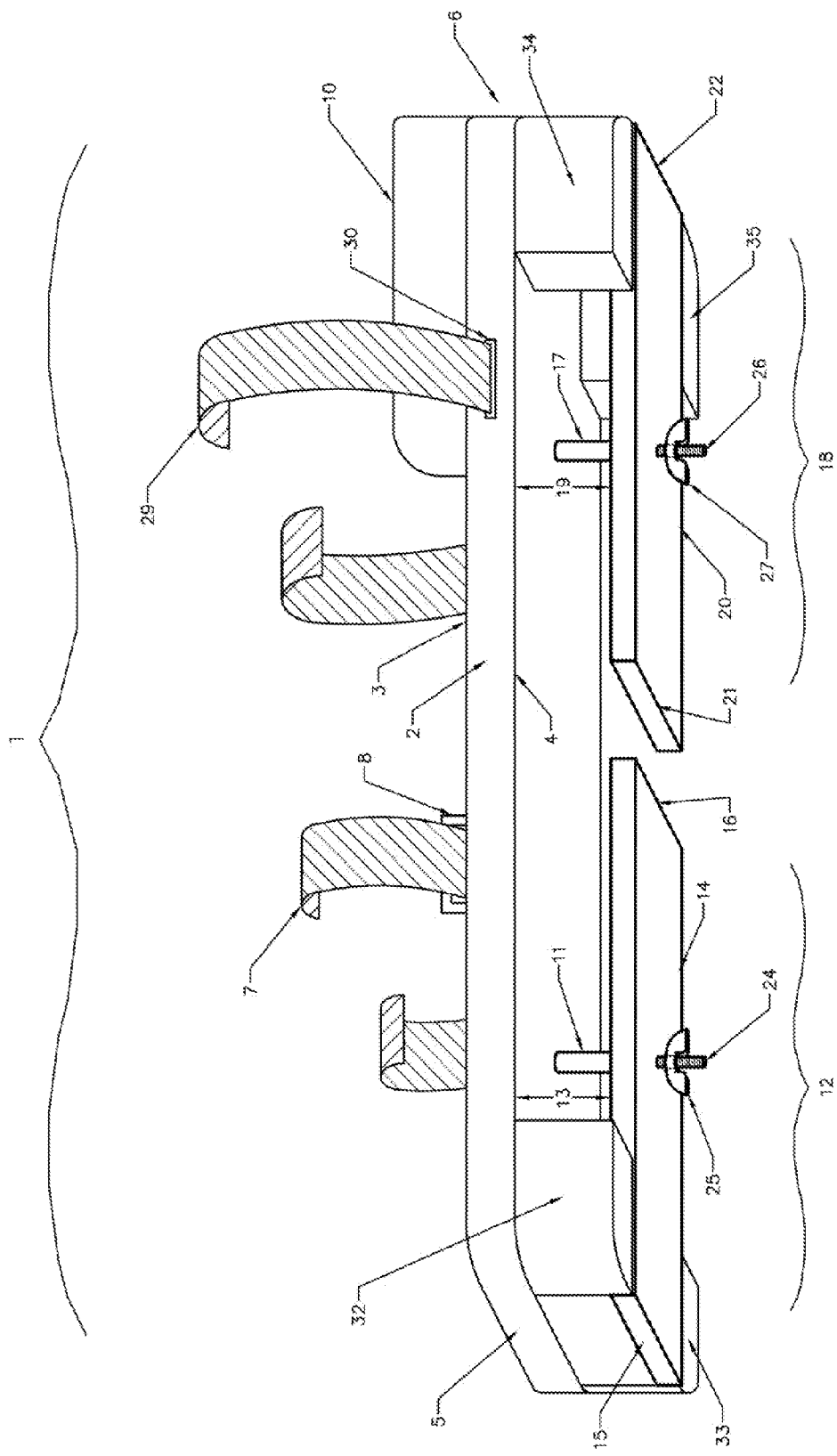
FIG. 10 is a perspective view of the article of manufacture of this invention shown in FIG. 2.

Turning now to FIG. 10, one can see a perspective view of the article of manufacture of this invention showing the numerous aspects of FIG. 2. The numbers used in describing FIG. 10 will refer to the same parts as discussed in FIG. 2. It comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 7 is connected to the platform 2 and positioned to secure the human's foot to the upper surface 3 of the platform. The strap 7 is shown here to be secured to a connection 8 shown on the upper side surface 3 of platform 2. The strap is shown as a fabric book and loop fastener VELCO® brand strap. The strap 7 is optional for people who have progressed to the point where it is no longer needed or had not required that level of security to begin with. The device further has an optional ridge 10 extending approximately vertically from the platform's upper surface 3 around the perimeter of the proximal end 6 of the platform 2 to aid in retaining the human's heel at the distal position of the platform when secured to the upper surface of the platform with the aid of the strap 7. An optional second strap 29 may be employed to aid in securing the foot to the platform surface 3 using connection means 30 to connect the strap to the platform 2. Secured to the lower surface 4 of the platform 2 is a distal body 11 extending perpendicularly from the distal region 12 of the lower surface of the platform a distance 13 that is about the thickness of the pedal of the bicycle and having a flexible but rigid distal plate 14 adjustably connected to the body 11. A second body, that is a proximal body 17 extending perpendicularly from the proximal region 18 of the lower surface 4 of the platform 2 by a distance 19 that is about the thickness of the pedal of the bicycle and having the plate 20 adjustably connected to the proximal body 17. While the plates can be snugged against the pedal by various means discussed herein with regard to the other figures, it is found that by having threaded bolts 24 and 26 extending from the respective bodies 11 and 17, threaded nuts 25 and 27 (for example wing nuts shown here) can be screwed onto the bolts to adjustably secure the plates against the pedal. For greater security of the foot on the platform attached to the pedal a releasable strap 7 is connected to the platform at the distal region 12 of the platform 2 and a second releasable strap 29 is connected to the platform in the proximal region 18 of the platform to secure the user's heel to the proximal region of the upper surface 3 of the platform 2. The second strap helps to ensure that the user's heel is securely attached to the platform 2. Also shown as an optional aspect are distal extensions 32 and 33, which are secured to the lower surface 4 and extend a depth that is sufficient to prevent any significant sideways movement of the distal end 15 of distal plate 14. Thus, distal end 15 of plate 14 is snugly secured between extensions 32 and 33 when the plate 14 is positioned to sandwich the bike pedal (not shown) between the lower surface 4 and the plate 14. Similarly, the lower surface 4 of platform 2 is shown having proximal body 17 attached to the lower surface 4 and threaded bolt 26 extending from the proximal body and fitting through the proximal region of plate 20, which is secured with wing nut 27. Also shown as an optional aspect are proximal extensions 34 and 35, which are secured to the lower surface 4 and extend a depth that is sufficient to prevent any significant sideways movement of the proximal end 22 of proximal plate 20. Thus, proximal end 22 of plate 14 is snugly secured between extensions 34 and 35 when the plate is positioned to sandwich the bike pedal between the lower surface 4 and the upper surface of plate 20. When plates 14 and 20 are fully secured by the wing nuts being tightened on the respective bolts the platform is secured to the pedal and the user's foot is then secured in the device and ready to use.

Figure 11:
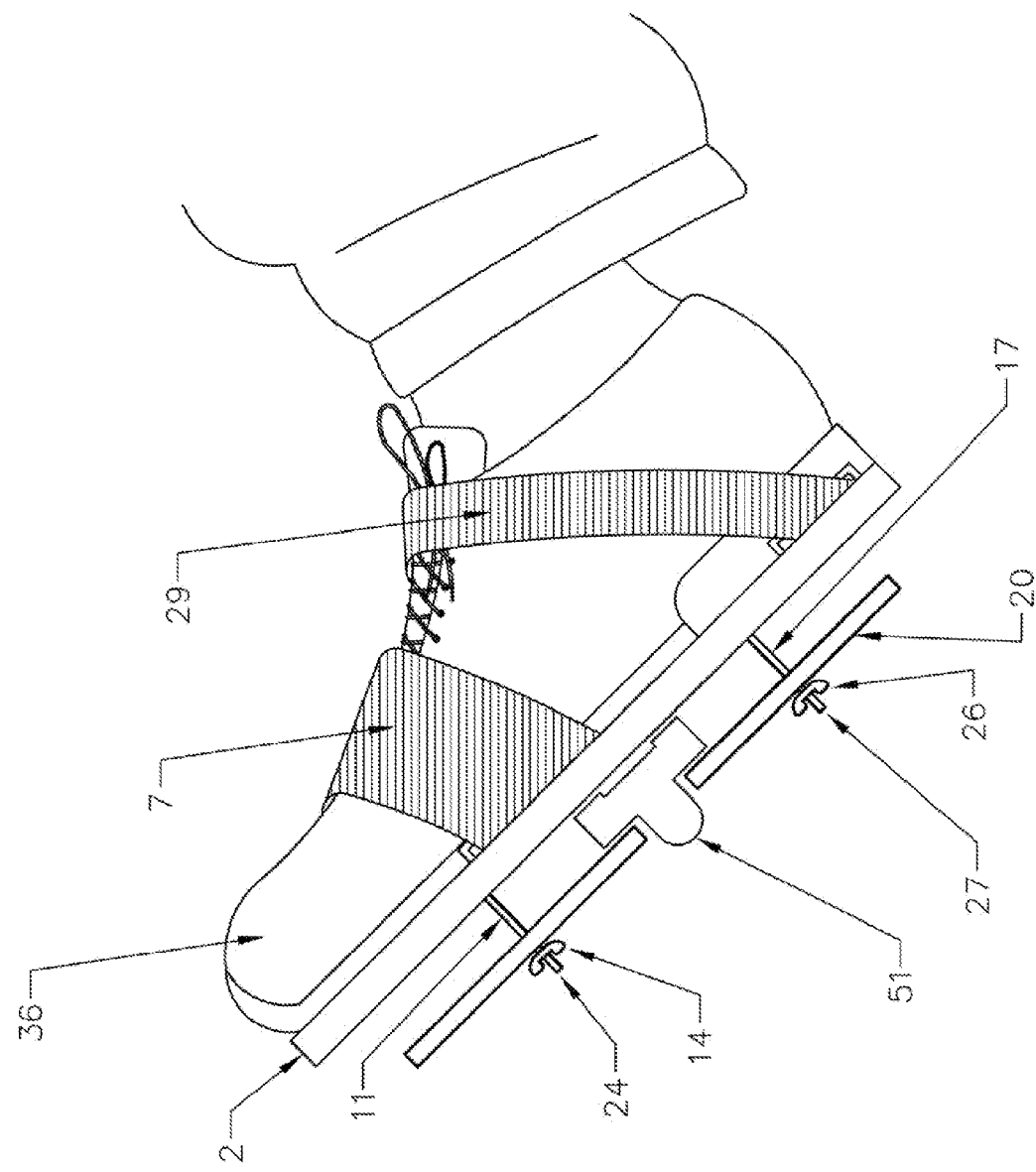
FIG. 11 is a perspective view of the device with two straps securing a user's foot to a pedal of a stationary bicycle.

Turning now to FIG. 11, one can see a perspective view of a user's foot, in an athletic shoe, secured to the device of the invention and positioned on a bicycle pedal 51. Here, a foot in an athletic shoe 36 is secured to the upper surface (hidden by the shoe) of platform 2 using two straps 7 and 29. The device is secured to bicycle pedal by securing distal plate 14 to distal body 11 by having distal threaded bolt 24 accommodating wing nut 25 (not shown) and by securing proximal plate 20 to proximal body 17 by having distal threaded bolt 26 accommodating wing nut 27. It will be appreciated that other modifications that are discussed in this section regarding FIGS. 1-10 and 12 can be similarly applied to FIG. 11.

Figure 12:
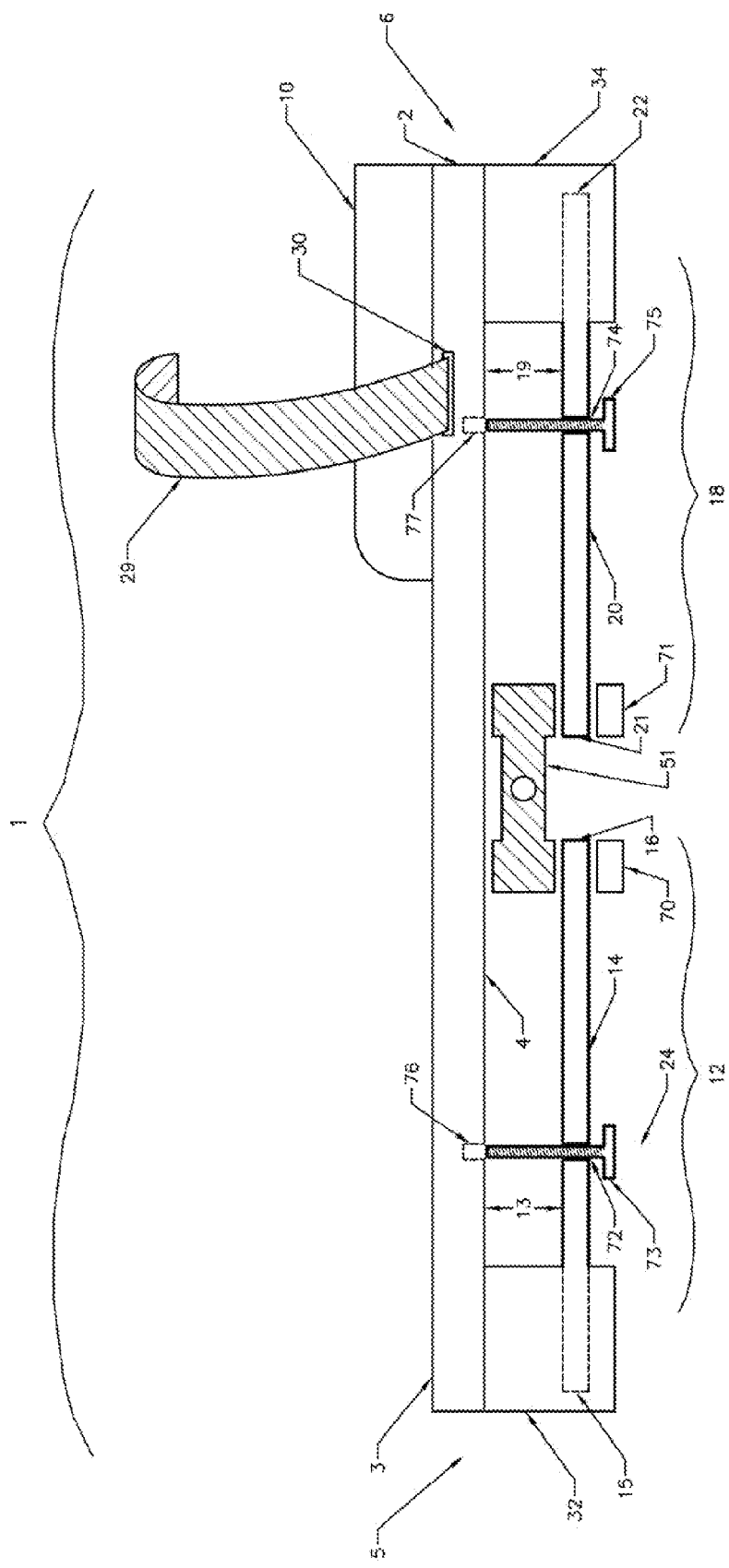
FIG. 12 is a side view of another aspect of the article of manufacture of this invention.

Referring finally to FIG. 12, another aspect of the article of this invention, again referred to as 1, is shown in a side view. It comprises a platform 2 upon which the human's foot can be placed, the platform having an upper surface 3 and a lower surface 4 and distal and proximal ends 5 and 6 corresponding to the toes and heel, respectively of the human's foot. To aid in securing the foot to the pedal, an optional releasable strap 29 may be employed to aid in securing the foot to the platform surface 3 using connection means 30 to connect the strap to the platform 2. The upper and lower surfaces of the platform may be smooth, but alternatively may be rough or uneven to aid in maintaining the foot in position on the upper surface of the platform and the pedal on the lower surface through frictional force. The strap 29 may designed as discussed in reference to FIGS. 1-4. The device further has an optional ridge 10 extending approximately vertically from the platform's upper surface 3 around the perimeter of the proximal end 6 of the platform 2 to aid in retaining the human's heel at the distal position of the platform. Such ridge may be part of a heel cup that is screwed or glued to the supper surface 3 of platform 2.

To connect the platform to the bike pedal 51 in FIG. 12, two plates 14 (the same numeral used in FIGS. 1) and 20 are used to secure the pedal. As in FIG. 2, a flexible distal plate 14 is adjustably connected to the lower surface 4 of platform 2, the plate having a distal edge 15 and a proximal edge 16. A second flexible but rigid proximal plate 20 is adjustably connected to the lower surface as well, the proximal plate having a distal edge 21 and a proximal edge 22. By having the two plates arranged as they are, allows for the fitting of the pedal between the lower surface 4 of platform 2 and the upper surface of each of plates 14 and 20, which can then be tightened against the pedal. In some cases having two plates as shown, each of them with a roughened surface to contact the pedal 51, will have security advantages to a single plate as shown in FIG. 1. While the plate can be tightened against the pedal by various means, it is found that by having threaded bolts 72 and 74 extending from the respective gripping heads 73 and 75 can be screwed into respective threaded, recessed female receptacles 76 and 77 to adjustably secure the plates against the pedal. The plates may be made of various materials such as metal, plastic, carbon fiber, rubber or wood that can be chosen to fit the type of characteristics desired. Tempered steel, a hard but flexible rubber, and polycarbonate plastic are examples of materials that are readily available. It is desirable to use a material that has good memory retention, that is, the ability of the plate to retain its initial flat configuration after being stressed by deformity upon tightening the plate against a pedal 51. Thus, in examining FIG. 12, one can see that the distal plate 14 and the proximal plate 20 extend toward each other but adjacent edges 16 and 21, respectively, of the plates do not do not overlap when the article is positioned on the pedal 51 by engaging the pedal between the lower side of the platform 2 and the upper surfaces of distal and proximal plates (14 and 20) and the plates are adjusted to secure the platform to the pedal and allow the human's foot to be secured to the upper surface of the platform with strap 29. In some cases it may be advantageous to attach bodies 70 and 71 to plates 14 and 20, respectively. These attached bodies may be glued or screwed on or machined from a single piece of material or be injection molded or be prepared by some other means known in the art. The bodies are particularly useful in the case of a very narrow pedal that requires extra force be applied against it. By turning over plates 14 and 20 to have the bodies 70 and 71 contacting the narrow pedal, the pedal is more tightly secured between the plates and the bottom surface of the platform. Also shown as an optional aspect are distal extension 32 and proximal extension 34, which are secured to the lower surface 4 and extend a depth that is sufficient to prevent any significant sideways movement of the distal end 15 of distal plate 14. Thus, distal end 15 (shown by the dotted lines) of plate 14 is snugly secured between extensions 32 and 33 (not shown in this figure, but can be seen in FIG. 10) when the plate 14 is positioned to sandwich the bike pedal 51 between the lower surface 4 and the plate 14. Proximal end 22 (shown as a dotted line) of plate 14 is snugly secured between extensions 34 and 35 (not shown in this figure, but can be seen in FIG. 10) when the plate is positioned to sandwich the bike pedal between the lower surface 4 and the upper surface of plate 20.

In making the device of this invention, the various parts can be tooled from PVC plastic or other sturdy plastics metal, wood, or hard rubber and screwing parts together or gluing them together. The platform may also be injection molded, having the optional ridge 10, connection points 8 and 9, distal body 11 and proximal body 17, and optional extensions 32, 33, 34, and 35 included in the injection molding process.

Figure 13:
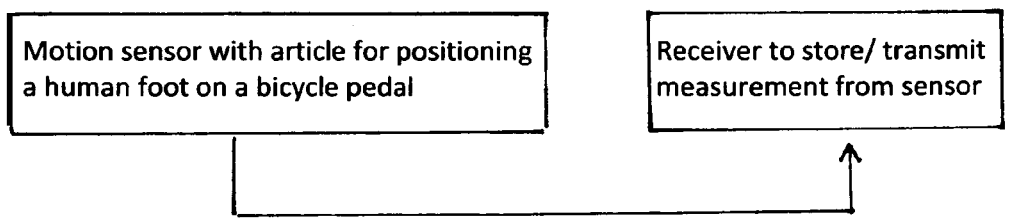
FIG. 13 provides a stylized view of the combination a sensor with the article of manufacture of this invention.

Having explained certain physical characteristics of the invention by referring to FIGS. 1-12, another aspect of the invention is the combination of the article of manufacture discussed herein in combination with a cyclometer, that is, a sensing device that senses the motion of the device of this invention and keeps track of the work being done by the user. This can be visualized by referring to FIG. 13. Usually this will require a transmitting module and a receiving module to track the information and display and store it. This combination is particularly useful for the user to track his or her progress towards the goal that might be set by a user, trainer, physical therapist, doctor, caregiver, or support group to track the progress of the user over time.

Generally the combination is an article of manufacture, as described hereinbefore, with motion sensor that allows for the measurement of the number of rotations of the bicycle pedal when used and a receiver that allows for the transmission or storage of such measurement. Such a sensor and receiver combination can be viewed as a cyclometer, which is a device that counts the number of rotations a bike pedal goes around and accumulates the number for the user to track, in essence it is a motion sensor and a data collecting device that may be mechanical or electronic. The sensing mechanism may employ optical, magnetic, electronic, infra red, ultrasonic, microwave, radio frequency, or other technology. In a simple exemplary operation a magnet is attached to the article of manufacture at the platform, plate, ridge, or any other part of the device shown in FIGS. 1-12. A traditional magnetic sensor, which may be based on the Hall Effect or on a magnetic reed switch, is attached to the body of the stationary bike being used in a position to detect when the magnet passes on each rotation of the platform, etc. The information is transmitted to the head of the cyclometer that can display the number of rotations. Such transmission may be done using a wired connection or a wireless connection. Relative distance can then be measured by the number of rotations. Speed can be calculated from distance against a lapsed time period. The trip distance, total distance traveled, trip time, current time, and other information can be displayed and collected to be transmitted by visual observation or by wireless data transmission to the user and others as part of the training and rehab program for the stroke patient. Other information, such as heart rate, may also be integrated into the system. A manufacturer that that makes useful cyclometers that may be adapted for this purpose is CATEYE®. Another company is Velocomputer™. Others will be apparent to one of skill in the art having read this information provided in this patent application. Alternatively, applications are available and readily modified for cell phone or iPhone or iPod Touch use that can be used, such as FitFu. In such a case the iPhone could simply be strapped to the leg of the user and by using the accelerometer the application would track the results and transmit the results to a trainer, physical therapist, doctor, caregiver, or others for support and progress tracking. Tracking the results is key in ensuring that the stroke patient is really doing the exercise. It has been shown in many studies that repetition is necessary to retrain the brain and the body to accelerate the recovery process.

Other aspects of the invention may be apparent to one of ordinary skill in the art once this application has been read in its entirety.

I claim as my invention:

1. An article of manufacture for positioning a human foot on a bicycle pedal to aid a human in operating a bicycle having such a bicycle pedal, wherein the article comprises:
   (a) a platform upon which the human's foot can be placed, the platform having an upper and a lower surface, distal and proximal ends respectively corresponding to the toes and heel of the human's foot, and a ridge extending approximately vertically from the platform's upper surface around the proximal end of the platform to aid in retaining the human's heel at the proximal end of the platform when positioned on the upper surface of the platform;
   (b) a distal plate adjustably connectable to the distal end of the lower surface of the platform, the distal plate having a distal edge and a proximal edge parallel with the distal end and proximal end of the platform, and
   (c) a proximal plate adjustably connectable to the proximal end of the lower surface of the platform, the proximal plate having a distal edge and a proximal edge parallel with the distal end and proximal end of the platform, wherein the distal plate and the proximal plate extend toward each other when the lower surface of the platform is positioned on the pedal by engaging the pedal between the lower surface of the platform and the upper surfaces of the distal plate and proximal plate so that the distal plate and proximal plate are adjustably connected to the platform to secure the pedal to the lower surface of the platform and allow the human's foot to be positioned and maintained to the upper surface of the platform as the bicycle pedal is rotated and wherein (d) one but no more than one threaded bolt extends through the distal plate into a corresponding threaded receptacle in the lower surface of the platform to allow the distal plate to be adjustably positioned against the pedal and one but no more than one threaded bolt extends through the proximal plate into a corresponding threaded receptacle in the lower surface of the platform to allow the proximal plate to be adjustably positioned against the pedal.

2. The article of claim 1, wherein a releasable strap is connected to the platform to aid in securing the user's foot to the upper surface of the platform.

3. The article of claim 1, wherein two releasable straps are connected to the platform to aid in securing the user's foot to the upper surface of the platform.

4. The article of claim 1, wherein the upper surface of the platform is roughened to aid in preventing sideways movement of the human's foot relative to the upper surface of the platform and the upper surface the distal plate, the upper surface of the proximal plate, and the lower surface of the platform are roughened to aid in preventing movement of the pedal relative to those surfaces.

5. The article of claim 1, wherein two projections extend from the lower surface of the distal end of the platform on either side of the distal plate to prevent lateral movement of the distal plate and two projections extend from the lower surface of the proximal end of the platform on either side of the proximal plate to prevent lateral movement of the proximal plate.

6. The article of claim 1, wherein the article is in combination with a motion sensor that allows for the measurement of the number of rotations of the bicycle pedal when used and a receiver that allows for the transmission or storage of such measurement.

\* \* \* \* \*